J. O'REILLY, Sr. & J. O'REILLY, Jr.
RESILIENT WHEEL FOR ROAD VEHICLES.
APPLICATION FILED JULY 1, 1912.
1,065,713.
Patented June 24, 1913.
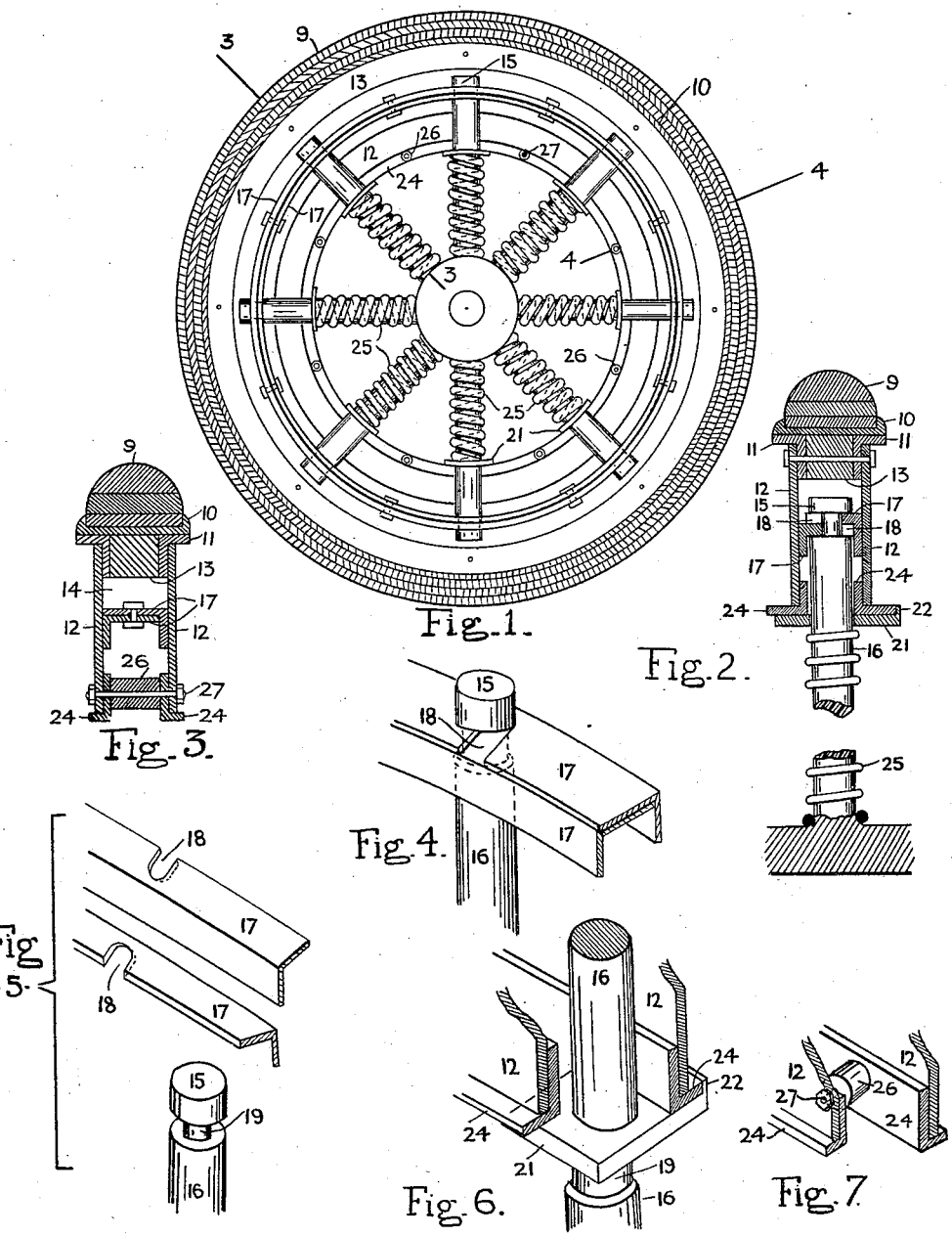

UNITED STATES PATENT OFFICE.

JAMES O'REILLY, SR., AND JAMES O'REILLY, JR., OF HUNTERS HILL, SYDNEY, NEW SOUTH WALES, AUSTRALIA.

RESILIENT WHEEL FOR ROAD-VEHICLES.

1,065,713.     Specification of Letters Patent.     Patented June 24, 1913.

Application filed July 1, 1912. Serial No. 706,969.

*To all whom it may concern:*

Be it known that we, JAMES O'REILLY, Sr., and JAMES O'REILLY, Jr., both residents of Ferry street, Hunters Hill, Sydney, in the State of New South Wales, Commonwealth of Australia, have invented certain new and useful Improvements in Resilient Wheels for Road-Vehicles, of which the following is a specification.

This invention appertains to wheels for road vehicles of the type wherein the felly is mounted upon an inner concentric rim that is resiliently supported from the hub by springs coiled about spokes radially affixed in the hub said spokes having their outer ends free to permit of radial movement in slots in said inner rim and has been devised to achieve the following objects, viz:— firstly, such improved construction that the shocks and strains imparted to the wheel during traction are distributed to and absorbed by the whole of the said spokes and springs, and, secondly, while effecting the first object to considerably improve the strength factor of the wheel.

According to this invention the first object above stated is achieved by coupling together all the free ends of the spokes by means of a band or bands preferably of strip steel either of continuous or segmental form and the second object mentioned by mounting the tire rim or felly upon the outer peripheral edges of a pair of rings preferably of strip steel such rings forming with the tire rim an annulus in which the outer and free ends of the spokes have radial without lateral movement between rollers contained within the annulus, the inner peripheral edges of said rings being resiliently supported by the springs coiled about the spokes.

Referring to the drawings accompanying and forming part of this complete specification and depicting a practical application of this invention, Figure 1 is sectional elevation of wheel, Fig. 2 vertical longitudinal section on line 3—3 Fig. 1. Fig. 3 transverse section on line 4—4 Fig. 1. Fig. 4 enlarged perspective view of construction at outer free end of the spokes. Fig. 5 similar view of free end of spoke and spoke coupling band construction. Fig. 6 similar view of the spoke bearing and method of supporting the rings upon the spoke springs, and, Fig. 7 enlarged perspective view of roller showing method of fastening same.

The channel rim 10 carrying solid rubber tire 9 is mounted on the angle iron bands 11 affixed to the inner face thereof and supported on the outer edges of the pair of flat parallel rings 12. Between the bands 11 is secured the felly 13 which forms with the rings 12 the annulus 14 in which terminate the outer ends 15 of the spokes 16, which spoke ends are coupled together for the purpose of distributing the traction shocks to the whole of them simultaneously, by means of the pair of angle iron bands 17 that are slotted (as at 18) to take the reduced portion 19 of the spokes and are bolted together when in position. The inner edges of the rings 12 bear upon the horizontal member of each of the angle iron strengthening bands 24 which member bears upon washers 21 provided one on each of the spokes 16 which washers are curved concentrically to said bands 12 and have a flange 22 at one outer edge to prevent any turning movement of same.

The washers 21 are supported by the springs 25 coiled under tension about the spokes 16 that have radial movement between the rollers 26 contained within the annulus 14 and positioned centrally between the spoke ends 15 being secured to the rings 12 by through bolts 27.

In use the shocks imparted to the wheel during traction are distributed to and absorbed by the whole of the spokes and springs by reason of the spoke coupling bands 17 and moreover a wheel of the type specified constructed to embody these improvements is rendered considerably stronger by the structural arrangements shown.

What we claim is:—

1. In a vehicle wheel, the combination with the channeled rim carrying the solid tire, of a pair of flat parallel rings, angle iron bands secured to the felly of the wheel for connecting the outer edges of said rings to said rim, and forming an annulus, the spokes having reduced upper ends, coiled springs surrounding the spokes having their lower ends supported by the hub of the wheel, slotted angle iron bands, adapted to receive the reduced upper ends of said spokes within their slots for coupling the outer ends of the same, and concentrically curved washers upon each of said spokes resting upon the upper ends of said springs for supporting the rings by the intermediary of strengthening bands supported upon said washer, substantially as described.

2. In a vehicle wheel, the combination with the channeled rim carrying the solid tire, of a pair of flat parallel rings, means for connecting the outer edges of said rings to said rim, and the felly of the wheel forming an annulus therewith, the spokes, coiled springs at the lower ends supported by the hub of the wheel and surrounding the spokes, means for resiliently supporting the inner edges of said ring upon the upper ends of said springs, means for coupling the outer ends of said spokes, and rollers within said annulus surrounding the upper ends of said spokes and secured to said rings by bolts, substantially as described.

In witness whereof we have hereunto affixed our signatures.

JAMES O'REILLY, Sr.
JAMES O'REILLY, Jr.

Witnesses:
JOHN STEVANS,
WALTER SIGMOND.